March 5, 1935.  E. V. HARLOW  1,993,343
EXTRUDED BITUMINOUS PRODUCT
Filed Oct. 17, 1931
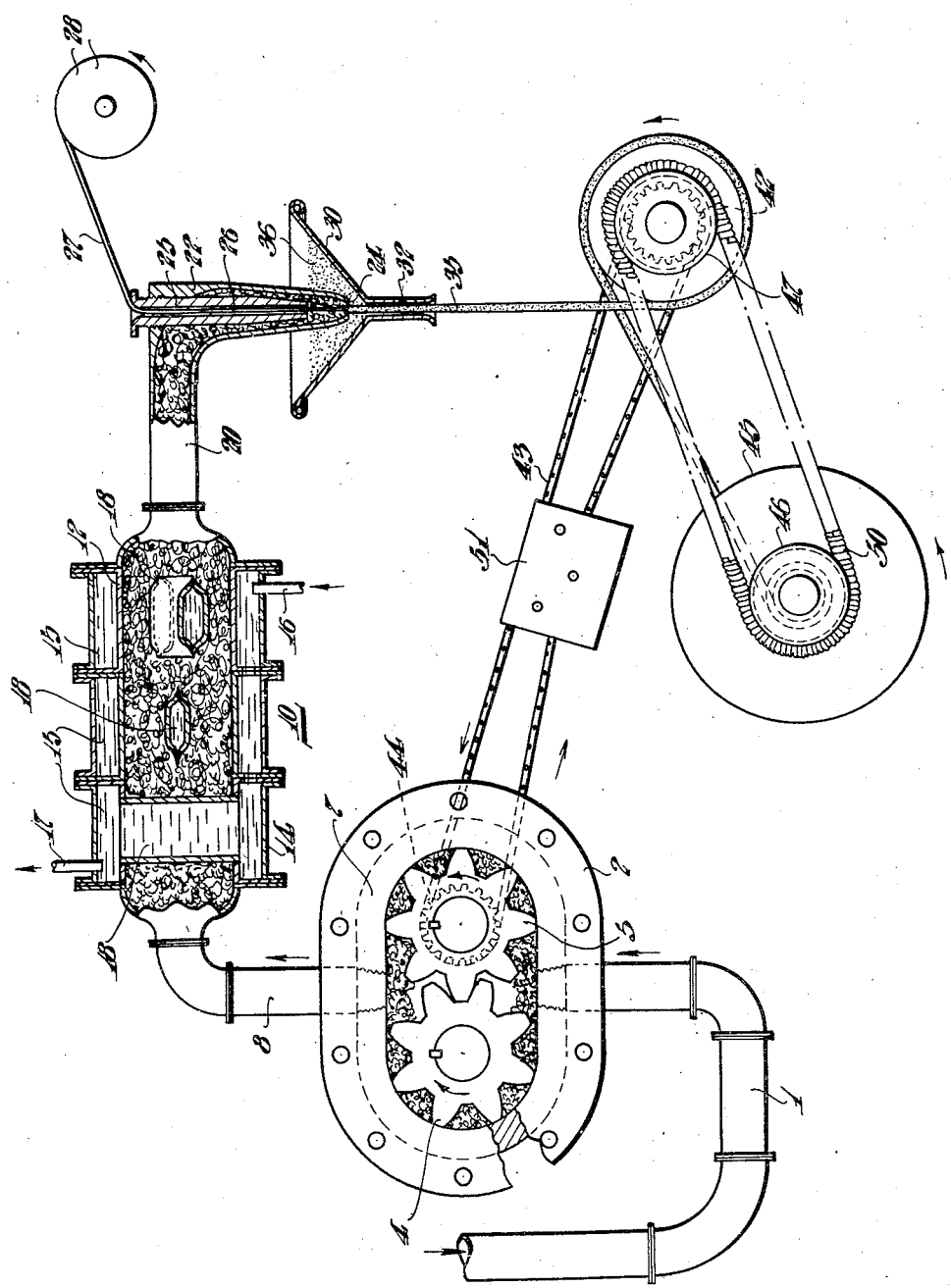
INVENTOR.
Earl V. Harlow.
BY
Jesse R. Langley
ATTORNEY.

Patented Mar. 5, 1935

1,993,343

UNITED STATES PATENT OFFICE 1,993,343

EXTRUDED BITUMINOUS PRODUCT

Earl V. Harlow, East Orange, N. J., assignor to The Koppers Company of Delaware, a corporation of Delaware Application October 17, 1931, Serial No. 569,533

5 Claims. (Cl. 154—45.5)

This invention relates to extruded bituminous products, and methods of extruding the same, and more particularly to products of this character adapted for filling or packing purposes.

It is an object of the invention to provide a product of this character which will not adhere when stacked or rolled for transportation or storage, but which may readily be caused to adhere in use.

Another object is to provide a method of extruding a bituminous product which will avoid adhesion of the die, and thereby avoid accumulation at the face of the die of the material being extruded.

Further objects are to simplify and improve the construction and operation of methods and products of this character, to render them advantageous for the purpose set forth.

Other objects and features of novelty will be apparent as the following description proceeds, reference being had to the accompanying drawing, in which The single figure is a diagrammatic view, partly in section and partly in side elevation, of apparatus by means of which the process may be carried out, and the product may be produced.

According to the present invention, a core of plastic material is extruded and coated with a bituminous material of higher softening point. The core is also preferably of bituminous material.

Heretofore it has been found difficult or impossible to extrude soft bituminous materials, because adhesion to the die and surface tension combined to overcome the internal friction of the material, causing a globule or deformed mass to accumulate at the face of the die. Furthermore, such extruded shapes had a tendency to stick together when stacked or rolled, and eventually return to an integral mass.

By maintaining a body of powdered bituminous material of higher softening point surrounding the softer core of bituminous material being extruded, these defects are materially reduced and may be entirely eliminated. The body of powdered material restrains the extruded core against lateral deflection and prevents deformation, and also prevents adhesion to the die.

Furthermore, the powdered bituminous material is taken up by the extruded softer material, due to the adhesive character thereof, thus forming a substantially non-adhesive coating therefor. This coating prevents portions of the extruded material from sticking together or to other materials with which they may come in contact in transportation and storage.

At the same time, in the finished product, the bituminous coating of higher softening point has the advantage of readily fusing with the softer core when slightly heated to form a substantially homogeneous mass of practically the same characteristics of the extruded core. This may be done by merely brushing the coated extruded product with a flame, or passing it near a suitable radiator or any other desired heating means.

This feature permits the extruded material to resume its adhesive character when used for filling purposes, so that a large cavity may be filled by several lengths of the extruded product, which will adhere and form the desired substantially integral mass. Also the single lengths employed as crack fillers may adhere to the sides of the crack as is desired for this use. Thus when applying the material to obtain waterproof joints, the problem of removing the protective non-adhesive coating is readily solved.

Inasmuch as even fairly soft bituminous materials become brittle at low temperatures, the extruded core may be reinforced by a continuous flexible element such as cord, wire, web, cloth, paper, or the like, depending upon the cross-section of the extruded material and the use for which it is intended. With this reinforcement, cracking of the bituminous material would not destroy the continuity and for most purposes would not impair its value.

Various fillers may be incorporated into the bituminous material being extruded as a core. These fillers are preferably non-metallic, and preferably fibrous materials. Such materials as sawdust, ground cork, asbestos fiber, or asbestine or diatomaceous earth, and the like may be employed, being selected according to the particular use desired.

The bituminous material of which the core is extruded is preferably one form of a composition comprising coal and an oil solvent therefor, according to the copending application of H. J. Rose and W. H. Hill, Serial No. 97,467, filed March 25, 1926 now Patent No. 1,925,005 of August 29, 1933. The preferred material which forms the coating is a different form of this composition, which has a higher softening point.

To prepare this composition which comprises coal and an oil solvent therefor, various kinds of grades of coal, preferably bituminous coking coals, are heated with oil-bearing substances such as tar, pitch and petroleum still residues.

The coal and oil are mixed and heated so that the coal becomes uniformly distributed therein, preferably dissolved.

The temperature to which the mixture is subjected is never raised above the decomposition temperature of the particular coal employed so that the finished product contains chemically undecomposed coal. This product has lower temperature susceptibility, greater toughness, and greater resistance to abrasion or wear than pitch. The proportions and treatment of the coal and oil may be varied to produce different forms of this composition comprising coal and an oil solvent therefor, which forms have different desired softening points for the composition.

The preferred material for the extruded core, therefore, is a form of this composition comprising coal and a solvent therefor, which form has a softening point of the order of 160° F., from 130° F. to 180° F., (Ring and Ball method). This material is a fairly soft, plastic, adhesive mass, which, when extruded, will adhere to itself and to the sides of the crack or cavity to be filled, and form a water-tight, practically homogeneous joint.

The preferred material for the protective coating is a different form of this composition comprising coal and an oil solvent therefor, which form has a softening point of the order of 300° F., from 280° F. to 320° F., (Ring and Ball method). This material is a relatively hard, less plastic, less adhesive mass which may be powdered, and in this form will be taken up by the extruded core, by virtue of the more adhesive character of the core.

Furthermore, this coating of powdered composition comprising coal and an oil solvent therefore may be fused by heating, as by brushing with a flame, and form with the core a substantially homogeneous mass having practically the characteristics of the material of the core, and having the softening point of the order of 160° F., from 130° to 180° F. (Ring and Ball method.)

However, pitches, asphalts and other bituminous materials may be employed within the purview of the present invention. Thus, the extruded core may be a form of this composition comprising coal and an oil solvent therefor, or pitch, asphalt, or various mixtures of these materials, with or without various fillers, such as sawdust or ground cork, asbestos fiber, asbestine, diatomaceous earth, to constitute a bituminous plastic material having a softening point of the order of 160° F., from 130° F., to 180° F. (Ring and Ball method.)

Similarly, the non-adhesive coating may be composed of higher melting point forms of the same class of materials, compositions comprising coal and an oil solvent therefor, or hard pitches, asphalts, and the like, or mixtures of the same, preferably in powdered form and without any filler, although a solid coating having a filler may be used. This coating thus constitutes or contains a bituminous material having a softening point of the order of 300° F., from 200° F. to 350° F., (Ring and Ball method). For instance, powdered pitch having a softening point of 200° F. may be employed for this purpose.

The particular characteristics of the materials mentioned affect their use according to the present invention. For instance, when asphalt is employed, the optimum softening point is of the order of 170° F. (Ring and Ball method), while with various pitches, the optimum softening point is of the order of 130° F. to 140° F. Furthermore, when a filler is employed, the softening point of the bituminous material with which the filler is mixed generally may be lower than when no filler is employed.

Also, if a comparatively large amount of filler is employed, a bituminous material may be used which has a proportionately lower softening point. In this respect, certain fillers differ from others with regard to their effect upon the selection of the softening point of the bituminous material with which they are to be mixed.

The softening points given are relative, and optimum under certain conditions, and may be varied to suit other conditions, such as the characteristics of the specific ingredients chosen, and the requirements of the use for which the filler is employed. Hence, by the term "of the order of" is meant a variation of at least 10° F. up to 20° F. or more above or below the optimum range of softening points stated, so long as the extruded core is relatively soft and plastic at ordinary atmospheric temperatures, and the coating is relatively hard and non-adhesive, and may be assimilated by the core upon application of heat above usual atmospheric temperatures.

Referring more particularly to the drawing, the softer bituminous material from which the core is to be extruded, and of the composition hereinbefore set forth, is supplied by a pipe 1 to a pump 2. The plastic material is supplied at such a temperature that air bubbles are largely excluded, and that the material will handle well in the pump.

The pump 2 may be of any suitable construction, but in the form shown comprises a pair of gears 4 and 5 snugly mounted in an oil tight casing 7. Rotation of the gears in the direction of the arrows shown draws the plastic material from the pipe 1 and forces it through the casing 7 and out therefrom into a pipe 8.

A cooler 10 receives the plastic material from the pipe 8, for the purpose of reducing the temperature of the plastic material to the optimum for extrusion. While the construction may be varied, this cooler comprises a central enlarged passage 12 surrounded by a jacket 14.

The jacket 14 comprises intercommunicating sections 15, to which cooling fluid, preferably water, is supplied by a pipe 16 and withdrawn by a pipe 17. The passage 12 is thus externally cooled, and may also be internally cooled by the cooling fluid passing through internal passages 18 communicating with respective sections 15 and extending transversely through the passage 12. The passages 18 are preferably longitudinally as well as angularly spaced, and streamlined to offer minimum obstruction to the passage of the plastic material.

From the cooler 10 the plastic material passes through a pipe 20, which connects the passage 12 to an extrusion die 22, which tapers to an orifice 24, which extrudes a rope-like core of the plastic material. When a reinforcing element is desired, the die 22 is provided with a central guide 25 threaded therein, tapering similar to the inner taper of the die 22. The central guide 25 is provided with an axial bore 26 through which a string, cord, or other fibrous or flexible reinforcing element 27 passes. The reinforcing element is supplied by a reel 28, from which it is unwound as it is drawn through the passage 26.

Surrounding the orifice 24 of the extrusion die is a hopper or funnel-like reservoir 30 which tapers to a delivery neck 32 coaxial with the orifice 24. The top of the neck 32 is spaced from the orifice 24 for a sufficient distance to expose the extruded core 35 to the bituminous material 36 of higher melting point and shown to be in the preferred powdered form.

The extruded core 35 is soft and adhesive, and the body of powdered material 36 prevents lateral deflection and consequent deformation of the extruded shape, and also being relatively non-adhesive, prevents the core from adhering to the face of the die. Furthermore, the powder adheres to the core and forms a non-adhesive protective coating therefor, which is maintained at the desired thickness by the inner diameter of the neck 32, which is of the desired increase over the diameter of the extruded core.

The extruded and coated core is withdrawn from the neck 32 by a transfer pulley 40 tangent to the axis of the die 22 and neck 32, and around which a single turn of the core passes. The pulley 40 is rigid with a sprocket 42 connected by a chain 43 with a sprocket 44 rigid with the gear 5 of the pump 2. Thus the extruded core is withdrawn at the same rate that the plastic material is supplied to the system.

From the transfer pulley 40, the finished product passes to a winding drum or reel 45 which is driven by a pulley 46 from a pulley 47 rigid with the transfer pulley 40. However, this drive must compensate for the increasing diameter of the winding periphery as the finished product layers accumulate thereon. For this reason a continuous coil spring 50 passes over the pulleys 46 and 47, for driving the reel 45 from the drive for the transfer pulley 40.

The die 22, the guide 25, and the hopper 30 are removable, and may be respectively replaced by larger or smaller sizes, for producing different forms of product, in which case a change-speed mechanism 51 is employed in order to correlate the changed production to the constant supply furnished by the gear pump 2.

While certain embodiments of the invention have been illustrated and described in such detail as to enable anyone skilled in the art to practice the invention, nevertheless it is to be understood that the invention is not to be limited to any of the details disclosed other than as necessitated by the development of the prior art. Instead, it will be understood that the invention embraces such embodiments of the broad idea as fall within the scope of the appended claims.

I claim as my invention:

1. A core of plastic material containing a composition of coal and an oil solvent which is capable of dissolving substantially all of the coal substance of the coal, said core having a coating of material containing a bituminous material of higher softening point than the composition of said core.

2. A core of plastic material containing bituminous material, said core having a coating of material containing a composition comprising coal and an oil solvent which is capable of dissolving substantially all of the coal substance of the coal, said coating having a higher softening point than the bituminous material of said core.

3. A core composed of a filler embodied in a composition comprising coal and an oil solvent which is capable of dissolving substantially all of the coal substance of the coal, said core having a coating of bituminous material having a higher softening point than said core, said filler comprising one or more of the following fillers: sawdust, ground cork, asbestos fiber, asbestine, and diatomaceous earth.

4. A core composed of a non-metallic filler embodied in a composition comprising coal and an oil solvent which is capable of dissolving substantially all of the coal substance of the coal, said core having a coating of bituminous material having a softening point higher than said composition.

5. A core composed of a non-metallic filler embodied in a composition comprising coal and an oil solvent which is capable of dissolving substantially all of the coal substance of the coal, said core having a coating of powdered composition comprising coal and a oil solvent therefor, said coating composition having a higher softening point than said core composition.

EARL V. HARLOW.